May 17, 1949.  V. E. ANDERSON  2,470,229
PATCH CUTTING MACHINE
Filed April 7, 1944  3 Sheets-Sheet 1

INVENTOR.
Victor E. Anderson
BY
Fred C. Matheny
ATTORNEY

INVENTOR.
Victor E. Anderson
BY
Fred C. Matheny
ATTORNEY

May 17, 1949.  V. E. ANDERSON  2,470,229
PATCH CUTTING MACHINE

Filed April 7, 1944  3 Sheets-Sheet 3

INVENTOR.
Victor E. Anderson
BY
Fred C. Matheny
ATTORNEY

Patented May 17, 1949

2,470,229

UNITED STATES PATENT OFFICE 2,470,229

PATCH CUTTING MACHINE

Victor E. Anderson, Pacific, Wash.

Application April 7, 1944, Serial No. 530,015

10 Claims. (Cl. 144—2)

This invention relates to a wood patch cutting machine that is particularly well adapted for cutting pointed oblong patches from thin pieces of veneer but that may be used for cutting pieces of similar shape from other material.

The veneer from which plywood is made frequently has defects, such as small pitch pockets, knots and the like. To conserve material and to make a better grade of plywood from any given material it is common practice to rout out or cut out these defects from the veneer that is to be used as surface or finish stock so as to leave an oblong hole with pointed ends at the location where the defect was and then to insert and adhesively secure within the hole a veneer patch of a size and shape to fit accurately and snugly within the hole. Such patches when properly fitted are substantially invisible in the finished plywood.

It is an object of my invention to provide a highly efficient and accurate machine for cutting the oblong pointed patches that are used in patching veneer.

Another object of my invention is to provide a veneer patch cutting machine in which cutter heads instead of saws are used in cutting the patches thus doing away with inaccuracies which arise from change of diameter of the saws, due to sharpening, and insuring the production of patches of uniform and perfect shape.

It is common practice to use concavo-convex circular saws for cutting veneer patches. These saws must be filed at frequent intervals to keep them sharp. Each filing changes the diameter of the saw and this change in the size of the saw changes the size and shape of the patches produced thereby and is productive of non-uniform patches. The cutter heads employed in my machine are capable of using bits or knives that are made from much harder steel than a saw can be made from and these bits will remain sharp over a long period of service. Also these bits or knives if and when they are sharpened, can be reground to their original shape and reset to their original diameter so that no change in the shape or size of the patch will result. This makes possible the continued production of patches of uniform shape and size.

Another advantage obtained by the use of a cutter head instead of a saw in cutting veneer patches is that the cutter head provides a smoother edge surface on the patch and this makes possible a closer fit of the patch in the hole or recess into which it is fitted. The provision of better fitting patches is conducive to patching that is invisible for all practical purposes and this makes it practical to use a greater number of patches in the sheets of veneer. Thus veneer with many defects may be more efficiently utilized and raw material conserved.

Another object of this invention is to provide a patch cutting machine which makes it both possible and practical to cut patches from veneer pieces of varying hardness and varying moisture content that are picked at random from the stock being handled. These patches made from material thus picked at random make possible a better matching of the patches with the general run of veneer being patched and will thus make it possible to improve the general appearance of the plywood made from this veneer.

Heretofore only the finest grade of soft veneer has been used for making patches. This is because the lower grades of veneer are liable to be drier and harder, will rupture and split more easily when sawed and will dull the saws much more rapidly than the softer high grades of veneer will. Even when the softest and best grade of veneer obtainable is used and the patches are cut with rotating circular saws there is a large percentage of loss due to splitting and breakage. This loss is substantially eliminated by the use of cutter heads, even when the patches are cut from material of average grade. From the above description it will be apparent that the patches made by sawing are usually all of high grade veneer while much of the stock on which these patches are being used is of medium and low grade. These patches of high grade veneer are more liable to be conspicuous in medium and low grade veneer panels than patches of a corresponding grade of material would be. My machine makes it possible to cut substantially perfect patches economically out of the general run of material thus providing patches of assorted grades which may be selected to better match the stock that is being patched.

Another object of my invention is to provide a patch cutting machine in which cutter heads are secured directly to the shafts of electric motors and the motors are mounted for rotary movement on axes that are substantially perpendicular to the motor shafts so that the cutter heads will describe true circles in the stock from which the patches are cut.

Another object is to provide for a slight pivotal or tilting movement between the motors and the axes about which they are rotatively moved whereby the motors can be tilted sufficiently to cause the cutter heads to enter and withdraw from the veneer as the motors move rotatively and to provide means for adjusting or varying the distance apart of the two axes about which the motors are rotatively moved to thereby vary the size of the patch that is cut.

Another object is to provide material hold down means operable in connection with the cutter heads for engaging the veneer from which the patch is being cut and holding said veneer immovable during the cutting operation.

Other objects of the invention will be apparent from the following description taken in connection with the accompanying drawings.

In the drawings Figure 1 is a front elevation of a patch cutting machine constructed in accordance with my invention, parts being shown in section.

Like reference numerals designate like parts throughout the several views.

Due to the fact that much of the mechanism hereinafter described is in duplicate at opposite sides of an upright longitudinal medial plane of the machine certain numerals have been used on the drawings to designate parts at one side of the machine and similar primed numerals have been used to designate corresponding parts at the other side of the machine.

The frame structure of this patch cutting machine comprises a table 1 upon which is mounted two upright, spaced apart side frame members 2—2' that support a cross frame member 3 at a distance above the table.

Figure 1:
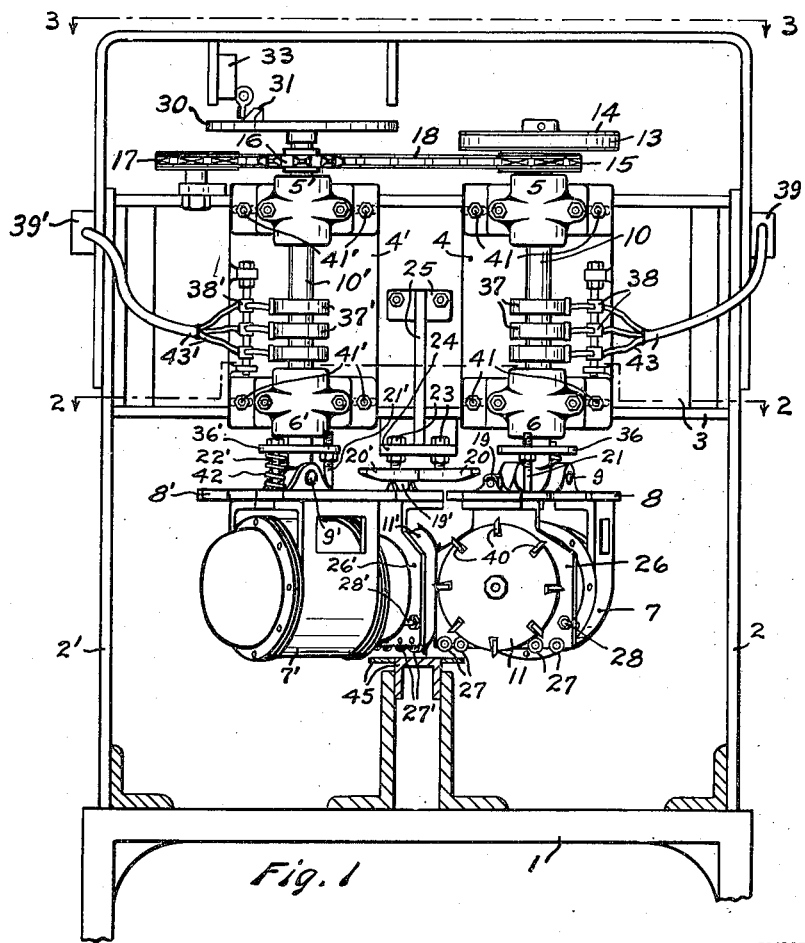

Two plates 4—4' are mounted on cross frame member 3. Upper bearings 5—5' and lower bearings 6—6' are secured to the plates 4—4' as by bolts 41—41'. Preferably the holes through the frame member 3 through which the bolts 41—41' extend are in the form of horizontal slots, as indicated by dotted lines in Fig. 1, so that the frame members or plates 4—4' can be adjusted to vary the distance between two shafts 10—10'.

The bearings 5—5' and 6—6' are combined radial and thrust bearings and carry upright motor supporting shafts 10—10'. The shafts 10—10' are pivotally connected with and support two motors 7—7'. The driven shafts of the motors 7—7' are positioned at substantially right angles to the motor supporting shafts 10—10' and said driven shafts carry cutter heads 11—11'.

The means for pivotally connecting the lower end portions of the shafts 10—10' with the motors 7—7' comprises plates 36—36' rigid with the lower end portions of the shafts 10—10' and connected by trunnion means 9—9' with other plates 8—8' to which the motors 7—7' are secured. The trunnion means 9—9' make it possible to tilt the motors 7—7' endwise to engage the cutter heads 11—11' with, or disengage said cutter heads from, the piece of veneer or like material from which a patch is being cut. In addition to the trunnion means 9—9' the plates 36—36' are connected with the plates 8—8' by bolts 21—21' and 22—22'. Some of the holes in the plates through which the bolts 21—21' and 22—22' pass are large enough to admit of the required tilting movement of the motors 7—7'. Compression springs 42 on the bolts 22—22' yieldingly urge the motors 7—7' into positions in which the cutter heads 11—11' will be clear of the strip or piece of veneer 29 from which the patch is to be cut.

Figure 2:
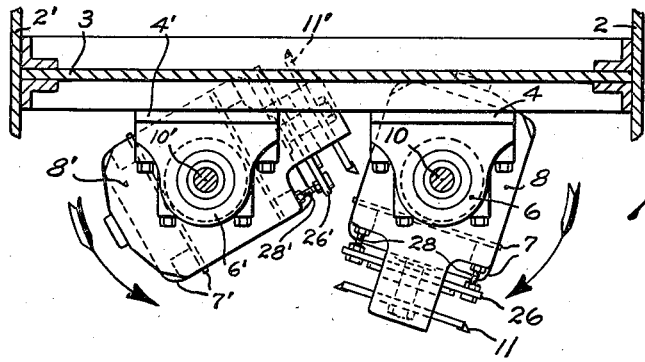
Fig. 2 is a fragmentary view partly in plan and partly in section taken substantially on broken line 2—2 of Fig. 1, and showing the motors and cutter heads, parts being omitted.

The means for tilting the motors 7—7' to move the cutter heads 11—11' downwardly into the veneer from which the patch is being cut are in the nature of two cam plates 20—20' positioned for engagement with rollers 19—19' that are rotatively mounted on the plates 8—8'. The cam plates 20—20' are adjustably supported from a bracket plate 24 by set bolts 23. A bracket arm 25 cooperates in rigidly securing the bracket plate 24 to the frame 3. As the motors 7—7' are rotatively moved in the directions indicated by the arrows in Fig. 2 the rollers 19—19' will successively pass under the cam plates 20—20' and the cutter heads 11—11' will be moved downwardly into cutting engagement with the veneer strip 29. After the required length of cut for forming one side of the patch has been made by a cutter head and before said cutter head cuts completely out at the edge of the veneer strip 29 the roller 19 or 19' will pass beyond the end of its cam plate 20 or 20' and the spring 42 will lift the cutter head clear of the veneer strip 29. This avoids cutting out at the edge of the veneer strip with consequent tearing and splitting of said veneer strip. Thus the cutter heads 11—11' are applied to the strip 29 after they are over said strip and are withdrawn from said strip before they cut out of the edge of the same.

Figure 5:
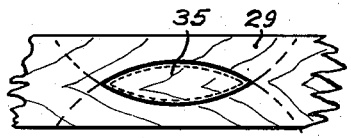
Fig. 5 is a fragmentary plan view showing a piece of veneer and a patch that has been cut from said piece of veneer but not removed from the piece of veneer.

The cutter heads 11—11' will describe circular arcs that intersect and overlap at the location where the cutter heads are moved across the strip 29. These arcs are indicated by broken lines in Fig. 5 and Fig. 7. Where these arcs overlap a patch 35 will be cut out. This patch 35 will be of oval shape with arcuate sides and pointed ends. The two motors 7—7' operate in angularly offset positions and preferably with their shafts at approximately right angles to each other so that the cutter heads 11—11' will engage the work one after another and will not interfere with each other.

After both cutter heads 11—11' have operated at one location on the veneer strip 29 and been retracted clear of said strip 29 a feed means will operate and advance the strip 29 to a new position.

The amount of tilting movement imparted by the springs 42 is limited by the bolts 22—22'. The set bolts 23 may be adjusted to vary the amount that the cams 20—20' will depress the cutter heads 11—11'. The cams 20—20' are correctly positioned and proportioned to depress the cutter heads at the proper time and to hold said cutter heads down for the proper distance in their travel.

To securely hold the veneer strip 29 down on the table and to insure that there will be no movement of said veneer strip during operation of the cutter heads 11—11' I provide plates 26—26' that are secured to and extend downwardly from the plates 8—8' and have rollers 27—27' rotatively mounted on their lower portions to engage with and roll upon the veneer strip 29. Adjusting bolts 28—28' provide means for positioning or gauging the plates 26—26' relative to the cutter heads 11—11'. The rollers 27—27' hold the strip of veneer securely while it is being cut as said rollers are so mounted as to follow the cutter heads 11—11' through their entire cutting operation. This insures accuracy in the finished patch.

Figure 3:
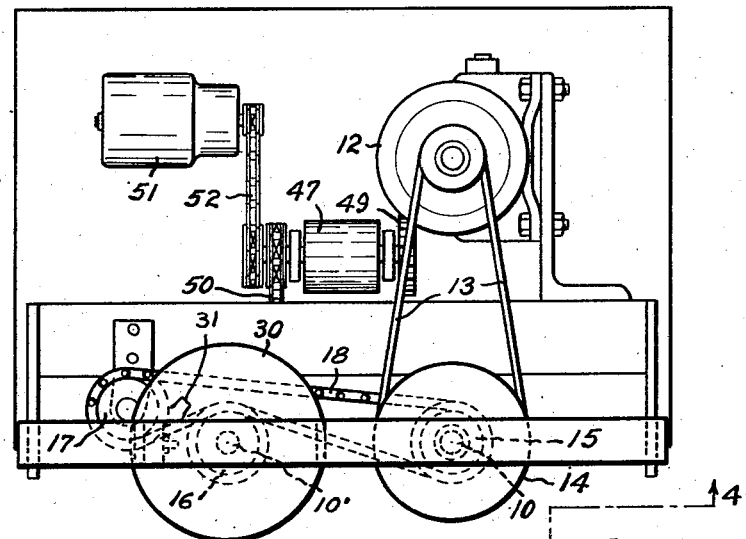
Fig. 3 is a fragmentary plan view looking down in the direction indicated by broken line 3—3 of Fig. 1 and showing the driving mechanism for rotatively moving the two motors, the motors and parts associated therewith being omitted.
Figure 4:
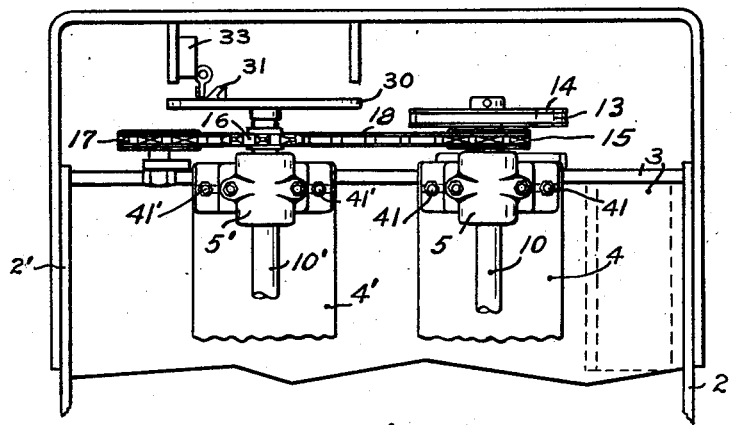
Fig. 4 is an elevation looking in the direction 4—4 of Fig. 3, parts being broken away.

The means for rotatively moving the motors 7—7' together with the cutter heads 11—11' comprises a motor 12, Fig. 3, connected by a V belt 13 with a belt wheel 14 on the motor carrying shaft 10. A link belt 18 operatively engages with a sprocket wheel 15 on the shaft 10, a sprocket wheel 16 on the motor carrying shaft 10' and an idler sprocket wheel 17. This provides for rotating the two motors 7 and 7' in the directions indicated by the arrows in Fig. 2 and at the same time allows for relative adjustment of the two shafts 10 and 10' toward and away from each other.

Electric current for motors 7—7' may be supplied from lead-in boxes 39—39' through conductors 43—43' to brush means 38—38' and collector rings 37—37' and thence to the motors 7—7' by suitable conductors 44—44' which preferably extend down to the motors 7—7' through the shafts 10—10'.

Figure 7:
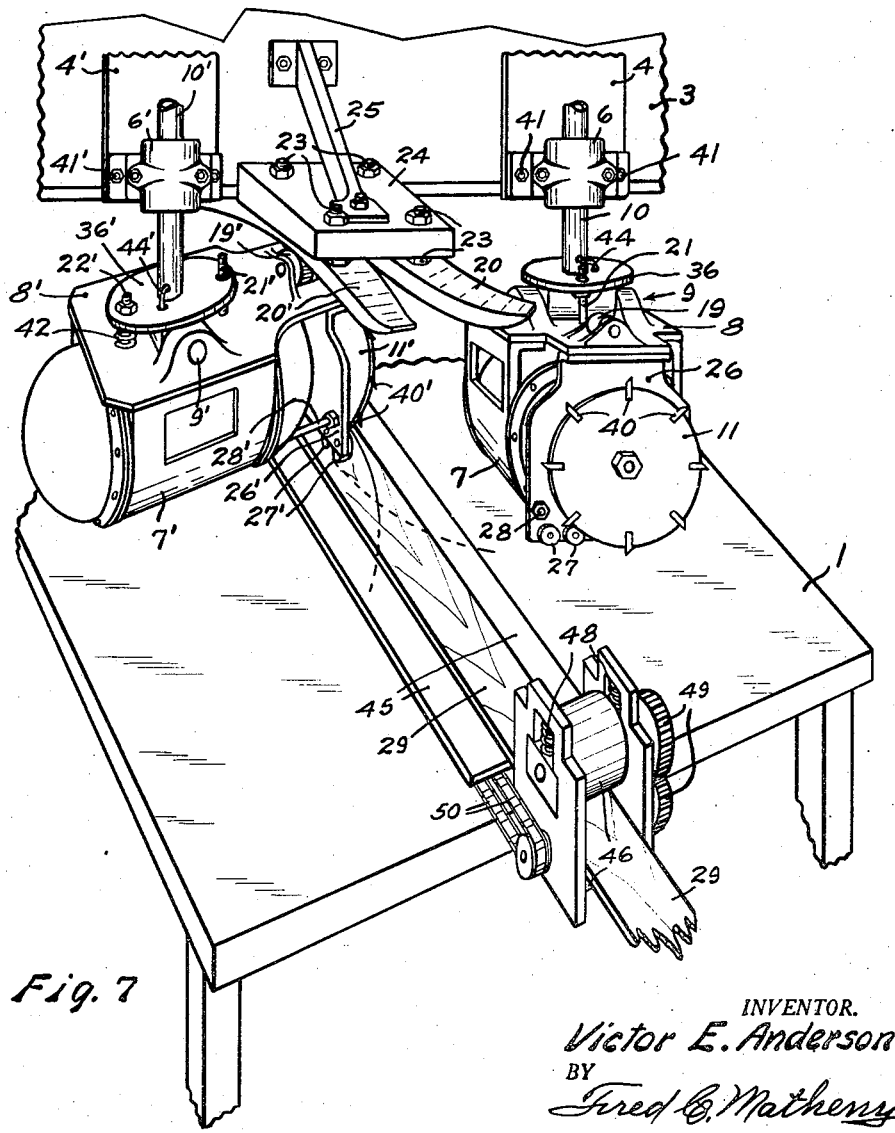
Fig. 7 is a fragmentary isometric view showing the motors and cutter heads and portions of the feed table and frame of my patch cutting machine.

The means for feeding veneer strips preferably comprises two pairs of feed rollers 46 and 47 positioned just in front of and just to the rear of the cutter heads, see Figs. 7 and 3. The two rollers of each pair are positioned in close relation one above another and are urged into firm contact with the strip 29 by spring means 48. Preferably all rollers are rubber coated to provide friction and avoid damage to the patch material 29. Preferably the two rollers of each pair are geared together by gear means 49 and the two sets of rollers 46 and 47 are connected for synchronous operation, as by link belt means 50. A driving motor 51 is connected by link belt means 52 with one of said rollers, such as a roller 47, Fig. 3. The operation of the driving motor 51 is synchronized with the movement of the cutter heads. This may be done by providing a disc 30 on the upper end portion of motor supporting shaft 10'. This disc 30 carries a cam 31 that operates a starter switch 33 for the motor 51. This motor 51 may be of the self stopping type so that it will operate just long enough to advance the strip 29 the proper amount for a new cut each time said motor 51 is started. The feeding forward of strip 29 takes places while the cutter heads 11—11' are clear of said strip and while the rollers 27—27' are out of contact with said strip 29.

A supporting means 45 for veneer or like material from which patches may be cut is provided on table 1 between sets of rollers 46 and 47.

Figure 6:
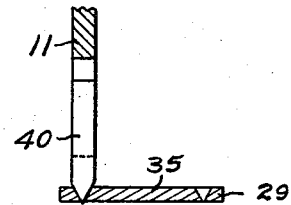
Fig. 6 is a fragmentary view partly in section and partly in elevation illustrating the application of my cutter head to a piece of veneer in cutting a patch.

Fig. 6 shows one of the knives 40 used in the cutter heads 11—11' and shows the tapered cross sectional shape of the cut made by these knives. This tapered shape of the cutting portion of the knives 40 gives to the edges of the patch 35 the proper incline desired for this work. The knives 40 provide very smooth inclined edges on the patch 35 and this patch will fit very accurately in a proper sized recess in a veneer panel that is to be patched. The knives 40 make a wide enough cut so that the patch 35 will be free to drop clear of the strip 29 as soon as all support beneath said patch is removed and the patches may be removed or discharged from the machine in any suitable manner.

The motors 7—7' herein are arranged to rotate continuously but it will be understood that they might be oscillated to make the cut. For instance a cutting stroke and a return stroke could be imparted alternately to the two motors.

The foregoing description and accompanying drawings clearly disclose a preferred embodiment of my invention but it will be understood that this disclosure is merely illustrative and that changes may be made within the scope and spirit of the following claims.

I claim:

1. In a patch cutting machine, two motors each having a substantially horizontal driven shaft; two circular cutting members on the respective driven shafts beyond the ends of the motors; means supporting said two motors for rotary movement about two substantially parallel axes which are substantially vertical and are spaced apart and respectively disposed substantially perpendicular to said driven shafts and substantially mid way between the two ends of each of said motors, said axes of rotation of said motors being relatively positioned so that the paths of movement of said two circular cutting members will intersect and overlap as said motors are rotatively moved; and means for rotatively moving said two motors in constant angular directions and at the same angular speed and with the driven shafts of said two motors in relatively offset angular relation thereby avoiding interference of said cutting members where their paths of movement overlap.

2. In a patch cutting machine, two motors each having a driven shaft; two circular cutting members on the respective driven shafts; means supporting said two motors for tilting movement relative to, and for rotary movement about two substantially parallel axes disposed substantially perpendicular to said driven shafts and positioned so that the paths of movement of said two circular cutting members will intersect and overlap as said motors are rotatively moved; material supporting means positioned at the location where the paths of movement of the two cutting members intersect and adapted to support patch material in the paths of movement of said circular cutting members; means for rotatively moving said two motors with their driven shafts in angularly offset relation; and means for tilting said two motors relative to their axes of rotation to thereby move said cutting members into engagement with material on said material supporting means as they are moving past said material supporting means.

3. In a patch cutting machine, a table; frame means positioned above said table; material supporting means on said table; material feeding means adapted to advance a strip of material across said material supporting means; two upright shafts supported by said frame above said table and on opposite sides of said material supporting means; two motors carried by said respective upright shafts and rotatable therewith; pivot means interconnecting each motor with its shaft providing for limited tilting movement of the motors; a driven shaft in each motor positioned at substantially right angles to the upright shaft that supports the motor; means for driving said upright shafts to rotate said two motors in opposite directions; a circular cutter head on the driven shaft of each motor movable in a circular path by rotation of the motor, said upright shafts being positioned so that the circular paths of movement of said cutter heads intersect and overlap at the location where said cutter heads pass the strip of material on said material supporting means; and means for angularly moving said motors on said pivot means to position said cutter heads in cutting engagement with said strip of patch making material as they pass the same.

4. In a patch cutting machine, two motors each having a driven motor shaft; a circular cutter member carried by each driven motor shaft; means supporting each of said motors for rotation on an axis substantially perpendicular to the axis of the motor shaft; means for rotating said motors to thereby move said cutter members in the intersecting overlapping circular paths; means for supporting patch forming material at the location of the overlapping paths of movement of said cutter members; a plate carried by each motor adjacent the cutter member thereof; and rollers on each of said plates operable to engage with and hold immovable the patch forming material as the same is being cut by said cutter members.

5. In a patch cutting machine, two substantially horizontal driven shafts; two mounting devices respectively supporting said two driven shafts for continuous rotation about upright parallel spaced apart axes; two cutter heads carried by the respective horizontal shafts movable in circular paths and spaced from the upright axes of said mounting devices far enough so that their paths of movement will overlap when said horizontal shafts are rotated about the upright axes of said mounting devices; driving means adapted to impart continuous rotary movement to each of said mounting devices; and means for supporting patch making material at the location where the paths of movement of said cutter heads overlap.

6. In a patch cutting machine, a substantially horizontal driven shaft; a mounting means supporting said driven shaft for rotation about an upright axis and for angular movement relative to said upright axis; a cutter head carried by the horizontal shaft and movable in a circular path when said horizontal shaft is rotated about the upright axis of said mounting means; driving means adapted to impart continuous rotary movement in one direction to said mounting means; means for supporting patch making material at one location in the path of said cutter head; and means adapted to angularly move said driven shaft vertically relative to the upright axis of said mounting means as said cutter head is passing the location of the patch making material to thereby apply said cutter head to the patch making material.

7. In a patch cutting machine, two substantially horizontal driven shafts; two mounting means respectively supporting said two driven shafts for rotation about upright parallel axes that intersect the driven shafts and for angular movement relative to said upright parallel axes; two cutter members carried by the respective horizontal driven shafts and movable in circular paths and spaced from the upright axes of said mounting means far enough so that their paths of movement will overlap when said horizontal shafts are rotated about the upright axes of said mounting means; driving means adapted to impart continuous rotary movement to each mounting means; means for supporting patch making material at the location where the paths of movement of said cutter members overlap; and means adapted to angularly move said driven shafts in vertical directions as said cutter members pass over the location of said patch making material to thereby apply said cutter members to the patch making material.

8. In a patch cutting machine, two motors each having a substantially horizontal driven motor shaft; two mounting means respectively supporting said two motors for rotation about upright parallel axes that are substantially perpendicular to and intersect the axes of the substantially horizontal motor shafts and for angular movement relative to said upright parallel axes; two circular cutter members carried by said substantially horizontal motor shafts and positioned adjacent ends of the respective motors, the distance between the two upright axes being less than the sum of the two distances between the cutter members and their respective upright axes; driving means adapted to impart continuous rotary movement to said two upright mounting means whereby the two cutter members will be revolved in paths that overlap at one location; means for supporting patch making material at the location where the paths of movement of said cutter members overlap; and means adapted to impart a complete oscillation to each motor to move the driven shaft thereof in a vertical direction during the time the cutting member carried by the motor shaft is passing across the patch making material.

9. In a patch cutting machine two motors each having a substantially horizontal driven motor shaft; two upright parallel motor mounting shafts supporting said motors and disposed with their axes substantially perpendicular to and intersecting the substantially horizontal axes of the driven motor shafts; two circular cutter members carried by said substantially horizontal motor shafts and positioned adjacent ends of the respective motors, the distance between the two upright motor mounting shafts being less than the sum of the two distances between the respective upright shafts and the cutter members supported by the driven motor shafts; pivot means connecting a motor with the lower end portion of each upright motor mounting shaft to provide vertical tilting movement of motors; spring means yieldingly holding each motor in a predetermined position on its pivot means; driving means adapted to impart continuous rotary movement to said two upright shafts whereby the motors will be rotated about the upright axes of said motor supporting shafts and the two cutter members will be revolved in paths that overlap at one location; means for supporting patch making material at the location where the paths of movement of said cutter members overlap; and cam means adapted to overcome the force of each spring means and angularly move each motor vertically during the time the cutting member carried by the motor shaft is passing across the patch making material to apply the cutter to the patch making material.

10. In a patch cutting machine, a substantially horizontal driven shaft; a mounting means supporting said driven shaft for rotation about an upright axis that intersects the axis of said shaft; a circular cutter member carried by the horizontal shaft and movable in a circular path when said horizontal shaft is rotated about said upright axis of said mounting means; driving means adapted to impart rotary movement in a continuous direction to said mounting means; means for supporting patch making material in the path of movement of said cutter member; and material hold down rollers carried by said mounting means and movable with said cutter member in a circular path and adapted to engage with and hold patch material while said material is being cut by said cutter member.

VICTOR E. ANDERSON.

REFERENCES CITED

The following references are of record in the file of this patent:

UNITED STATES PATENTS

| Number | Name | Date |
|---|---|---|
| 1,564,349 | Hires | Dec. 8, 1925 |
| 1,614,076 | McClenathen | Jan. 11, 1927 |
| 1,816,853 | Jayne | Aug. 4, 1931 |
| 1,839,196 | Cameron | Jan. 5, 1932 |
| 1,855,662 | Bayley | Apr. 26, 1932 |
| 1,928,029 | Peterson | Sept. 26, 1933 |
| 2,077,623 | Gragg | Apr. 20, 1937 |
| 2,151,204 | Hartman | Mar. 21, 1939 |